United States Patent Office 3,752,771
Patented Aug. 14, 1973

3,752,771
SYNTHESIS GAS PRODUCTION BY PARTIAL OXIDATION
Roger M. Dille, La Habra, and Warren G. Schlinger, Pasadena, Calif., assignors to Texaco Inc., New York, N.Y.
No Drawing. Continuation-in-part of applications Ser. No. 649,490, June 28, 1967, and Ser. No. 692,306, Dec. 21, 1967. This application June 19, 1969, Ser. No. 834,879
Int. Cl. C07c 1/02
U.S. Cl. 252—373
15 Claims

ABSTRACT OF THE DISCLOSURE

In a high pressure synthesis gas generating process continuous control of the pH in the system may be accomplished by supplementing the nitrogen in the primary hydrocarbon fuel and oxygen-enriched gas fed to the generator with a controlled amount of nitrogen in the form of nitrogen containing organic compounds, and continuously neutralizing all or a portion of the formic acid produced in the system with ammonia synthesized in the system. Carbon-steel process equipment and piping is thereby protected from corrosion and system upsetting emulsions are prevented from forming in the carbon recovery zone.

This application is a continuation-in-part of our application Ser. No. 649,490, filed June 28, 1967 and application Ser. No. 692,306, filed Dec. 21, 1967.

BACKGROUND OF THE INVENTION

Field of the invention

This invention relates to the production of synthesis gas. More particularly it relates to improvements in the partial oxidation process for generating hydrogen and carbon monoxide which prevent the build-up of corrosive formic acid, excess ammonia, emulsions, and gelatinous precipitates.

Description of the prior art

Until recently, the highest pressure levels used commercially for the production of synthesis gas (mixtures of hydrogen and carbon monoxide) by the partial oxidation of a hydrocarbon fuel was about 550 p.s.i.g. We have found that when the hot product gases from a high pressure synthesis gas generator operating at pressures above about 600 p.s.i.g. were cooled by quenching in water, the quench water became acidic. This acidic condition causes any carbon-steel piping, valves, fittings and other equipment in the system made from ordinary carbon-steel to corrode. Neutralization of the acidic quench water solely by large additions of a chemical alkali from an external source was found to be ineffective and expensive. High costs make it undesirable to replace all of the carbon-steel piping and components in the system with parts made from special corrosion-resistant alloys. Furthermore alloy-cladding the heavy walled carbon-steel vessels required for the high pressure partial oxidation process involve many practical problems.

SUMMARY

In the process for making synthesis gas by the partial oxidation of a primary hydrocarbon fuel enriched with supplemental amounts of a nitrogen containing organic compound and an oxygen containing gas at a pressure in the range of about 600 to 3000 p.s.i.g. and cooling the hot product gas in quench water, the pH of said quench water is continuously controlled by neutralizing all or a portion of the formic acid produced in the system with ammonia synthesized in the system. The nitrogen content of the primary hydrocarbon fuel and said oxygen containing gas are determined and based on the amount of nitrogen present, a supplemental amount of nitrogen in the form of nitrogen containing organic compounds is introduced into the reaction zone, for example in admixture with said primary hydrocarbon fuel. Ammonia is continuously synthesized in the reaction and quench zones by the non-catalytic reaction of nitrogen and nitrogen radicals with a portion of the hydrogen being simultaneously produced by the process. The amount of nitrogen supplied to said reaction zone is sufficient to neutralize said formic acid, with said synthesized ammonia to a level noncorrosive to carbon-steel i.e., pH of 5 or higher.

In another embodiment of the invention, where it is desired to have the quench waters slightly acidic to prevent system upsetting emulsions from forming in the carbon recovery zone, the nitrogen is supplied to said reaction zone, in an amount sufficient to neutralize a portion of said formic acid to a pH level of 5 and higher but less than the stoichiometric quantity required to react with substantially all of said formic acid. That is, the pH of the quench water is maintained in the range between 5 to 7, inclusive.

It is therefore an object of the present invention to improve the economy and efficiency of the continuous partial oxidation process by providing a continuous pH control for the quench water.

Another object of this invention is to provide a carbon recovery process for purifying synthesis gas using light hydrocarbon liquid and fuel oil extractants, which process is fairly insensitive to the quality of said extractants and which is characterized by the absence of system upsetting emulsions.

Still another object of this invention is to provide a continuous stream of noncorrosive synthesis gas.

A still further object of this invention is to improve the operation of a high pressure synthesis gas process by preventing the build-up in the system of gelatinous precipitates, corrosive formic acid and excess ammonia.

DESCRIPTION OF THE INVENTION

By the process of our invention the nitrogen content of a primary hydrocarbon fuel and an oxygen containing gas is determined and responsive to said determination a controlled amount of supplemental nitrogen in the form of nitrogen containing organic compounds is introduced into the reaction zone of a high pressure synthesis gas generator to supplement the nitrogen in the primary hydrocarbon fuel and in the oxygen containing gas feed. A stream of hot synthesis gas containing small amounts of $NH_3$, $HCOOH$, and particulate carbon is produced in the reaction zone by the partial oxidation of the nitrogen enriched hydrocarbon fuel with substantially pure oxygen or oxygen enriched air. The introduction of water into the reaction zone is optional, depending on the type of hydrocarbon fuel feed. The hot product gas from the reaction zone may be partially cooled by means of a heat exchanger such as a waste heat boiler followed by further cooling and scrubbing with water, or by direct quenching in water in a cooling zone, forming a dispersion of particulate carbon in water. Clarified water is separated from the carbon-water slurry and recycled to the cooling and scrubbing zones. The nitrogen content in the reactant stream is maintained high enough so that sufficient ammonia may be continuously synthesized in the gas generation and quench zones along with the product gas to neutralize all or a portion of the $HCOOH$ in the system and thereby render the product gas stream and quench water noncorrosive.

Raising the pH of said quench and scrubbing waters or the pH of the condensate from said heat exchanger to a level which is noncorrosive to carbon-steel by means of this invention is encompassed by the meaning of the term "neutralize."

In a first embodiment of this invention, the formic acid produced in the partial oxidation system for generating hydrogen and carbon monoxide is controlled by continuously maintaining the molal concentration of ammonia synthesized in the system greater than the molal concentration of the formic acid produced in the system regardless of their chemical states, so that the system and the materials therein fall within a pH range of 5 or higher. Formic acid attack on the iron alloy process equipment is thereby prevented.

In another embodiment of this invention, the formic acid produced in the system is controlled by continuously maintaining the molal concentration of ammonia synthesized in the system less than the molal concentration of the formic acid in the system, regardless of their chemical states so that the system and the materials therein fall in a pH range between 5 to 7 inclusive. Stated another way, the total amount of nitrogen supplied to the reaction zone is sufficient to neutralize a portion of the formic acid produced in the system to a pH level not less than 5 but is less than the stoichiometric quantity required to react with substantially all of said formic acid. By controlling the pH of the quench water in this range not only is the attack on iron alloy process equipment prevented but water-carbon-liquid hydrocarbon emulsions and gelatinous precipitates are avoided in the carbon recovery zone. The synthesis gas generator in our process consists of a compact, unpacked, freeflow, noncatalytic, refractory lined steel pressure vessel of the type described in U.S. Pat. 2,809,104 issued to D. M. Strasser et al., which patent is incorporated herewith by reference.

Operating conditions in the reaction zone of the generator include the following: temperature 1800 to 3500° F., pressure 400 to 3000 p.s.i.g., and preferably 600 to 3000 p.s.i.g., atomic ratio of total oxygen to carbon in the feed (O/C ratio) about .80 to 1.5, and a weight ratio of steam to liquid hydrocarbon in the feed about 0.1 to 3.

At least fifty weight percent of the generator fuel consists of said original hydrocarbon fuel which by definition shall be referred to as the primary hydrocarbon fuel feed to the reaction zone. The primary hydrocarbon fuel may be any of a wide variety of feedstocks suitable for use in the partial oxidation process including: natural gas, propane, butane, various petroleum distilaltes and residua, lignite, bituminous and anthracite coals, naphtha, gas oil, residual fuel, reduced crude, whole crude, coal tar oil, shale oil and tar sand oil. Slurries of solid carbonaceous feedstocks in water or liquid hydrocarbons, are also suitable.

The oxygen containing gas may be substantially pure oxygen (99.5 mole percent $O_2$ containing 0% nitrogen), or oxygen-enriched air (40 mole percent $O_2$ and higher).

Organic nitrogen compounds from an external source which may be used to supplement the primary hydrocarbon fuel by being introduced into the reaction zone along with the primary hydrocarbon fuel include: pyridines, carbazoles, indoles, pyrroles, quinolines and porphyrins. These nitrogen containing organic compounds may be supplied to the reaction zone individually, in combination, or as naturally present in varying amounts in liquid hydrocarbon fuels, petroleum distillation bottoms, and coal tar nitrogen bases. Other nitrogen containing organic compounds from an external source that may be supplied to and burned in the reaction zone along with the primary hydrocarbon fuel include hydrocarbyl amines containing from 1 to 50 carbon atoms or higher including primary, secondary and tertiary amines wherein the hydrocarbyl groups thereon comprise alkyl, aryl, cycloalkyl, their mix types and unsaturated analog groups, and crude sources of these compounds. Examples of these compounds include hexylamine, aniline, and sec-alkyl primary amines in the range of $C_{10}$ to $C_{14}$.

The nitrogen containing organic compounds may be introduced into the reaction zone to supplement the nitrogen content in the primary hydrocarbon fuel feed by any suitable method, including the following:

(1) By blending a supplemental amount of nitrogen containing organic compound with the primary hydrocarbon fuel feed, and introducing the mixture into the reaction zone.
(2) By blending a supplemental amount of a liquid hydrocarbon fuel or coal tar nitrogen base containing naturally occurring complex organic nitrogen compounds with said primary hydrocarbon fuel feed, and introducing the mixture into the reaction zone.
(3) Introducing separate streams of the primary hydrocarbon fuel feed and the supplemental nitrogen containing organic compounds into the reaction zone.

For example, to control the pH of the quench water at a level of 5 and higher while at a quench water temperature in the range of 300 to 650° F., about 5 to 50 weight percent and preferably 10 to 20 weight percent of a liquid hydrocarbon fuel containing about .30 to 3.0 weight percent of nitrogen or more in the form of naturally occurring nitrogen containing organic compounds may be blended with about 50 to 95 weight percent of the primary hydrocarbon fuel and the mixture introduced into the reaction zone. Similarly, under the same conditions, pH control of the quench waters to prevent corrosion may be effected by introducing a comparatively high nitrogen containing organic material into the reaction zone to supply a comparable amount of nitrogen, thereby supplementing the nitrogen in the primary fuel and oxygen-enriched air.

In one embodiment of our invention, the hot gaseous effluent from the reaction zone comprising essentially hydrogen and carbon monoxide, and containing small amounts of particulate carbon, $CO_2$, $H_2O$, $H_2S$, $CH_4$, $NH_3$, and $HCOOH$ may be quickly cooled below the reaction temperature to a temperature in the range of 300 to 650° F. by direct quenching in water. The cooling water may be contained in a carbon-steel quench vessel located immediately after the reaction zone of said gas generator.

A large diameter dip leg starting at the bottom end of the reaction zone and discharging beneath the water level in the quench tank serves as an interconnecting passage between the reaction zone and the quench zone through which the hot product gases pass. This also substantially equalizes the pressure in the two zones.

A concentric draft tube, open on both ends, surrounds said dip leg, creating an annulus through which the mixture of gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon recovery zone is normally introduced through a quench ring at the top of the dip-leg to cool the metal at that point. Large quantities of steam are generated in the quench vessel and the quench chamber may be likened to a high output, high pressure boiler. Since the heat is transferred by direct contact rather than through metal, this boiler is relatively insensitive to scale-forming mineral solids but care should be taken to keep the pH above 5 to prevent corrosion. This pH control may be accomplished by the process of this invention. Because of the high concentration of hydrogen and the absence of oxygen, hydrogen sulfide and carbon dioxide in the product gas are not ordinarily corrosive to carbon-steel.

The turbulent condition in the quench tank, caused by the large volumes of gases bubbling up through said annulus space, helps the water to scrub the particulate carbon from the effluent gas, forming a dispersion of particulate carbon in the quench water. Additional steam required for any subsequent shift conversion step is picked up during quenching.

For a detailed description of the quench vessel, reference is made to U.S. Pat. 2,896,927, issued to R. E. Nagle et al., which is herewith incorporated by reference.

Alternately, the hot product gas stream from the reaction zone may be partially cooled by indirect heat exchange in a waste heat boiler. The entrained particulate carbon may be then scrubbed from the carrier gas by contacting and further cooling the effluent stream of product gas with quench water in a gas-liquid contact apparatus, for example a spray tower, venturi scrubber, bubble plate contactor, packed column, or in a combination of said equipment. The scrubbing water may be acidified by absorption of formic acid produced by the process and the pH controlled at a desired level as previously described. For a detailed description of cooling synthesis gas by means of a waste heat boiler and a scrubbing tower, reference is made to U.S. Pat. 2,980,523, issued to R. M. Dille et al.

We have found that, depending on the specific operating conditions, up to 1% of the carbon in the generator fuel may be converted into formic acid. The primary reaction is between carbon monoxide in the gaseous product stream and $H_2O$ in the reaction and quench zones. Some formic acid may be made also in the system by hydrogen reacting with carbon dioxide. The formic acid is produced in the reaction zone and passes with the product gas into the quench water where ionization takes place.

For economical operation, the quench water is sent to a carbon recovery zone where particulate carbon is removed and the clear water is recycled to the quench zone. When the synthesis gas generator is operated under steady-state conditions with large volumes of product gases being quenched in recycled water in the quench zone, the concentration of formic acid builds up rapidly in the system, turning the quench water acidic.

Unless prevented, the pH of the circulating water system falls to below 5, and at a temperature of about 300 to 650° F. the acidic water will attack the carbon-steel vessels and piping in the system at a rate of about .05 to 0.8 inch per year. About 200 to 2000 parts per million of soluble ferrous formate may be then formed. Due to the buffering action of the formate, large quantities of alkali would then be necessary to neutralize the acidity in the quench systems. Furthermore, the rate of corrosion is accelerated when the hot acidified quench water is at high velocity. For under such conditions, protective surface films are eroded, exposing fresh metal to attack.

By this invention ammonia is continuously synthesized without a catalyst in an unpacked gas generator along with the product gas and reacted with the formic acid in the system to produce ammonium formate. Nitrogen for the ammonia synthesis may be derived from any of the following sources, individually or in combination: by cracking organic nitrogen compounds supplied with the nitrogen enriched hydrocarbon fuel feed stock to produce atomic N and the free radicals $NH$ and $NH_2$; and, as elemental nitrogen in admixture with gaseous hydrocarbon fuels, or in admixture with the gaseous oxidant, such as oxygen-enriched air.

At the high temperatures and pressures prevailing in the reaction and cooling zones some of the hydrogen in the product gas combines with the nitrogen or the high energy nitrogen radicals supplied by the fuel or oxidant; and, by noncatalytic gas phase reactions ammonia is continuously synthesized. In this manner, about 30% of the nitrogen supplied in a liquid or solid hydrocarbon fuel as organic nitrogen compounds may be converted into ammonia. However, only up to 15% of the less-reactive elemental nitrogen supplied with gaseous fuels and gaseous oxidants may be converted into ammonia. By controlling the quantity of nitrogen supplied to the generator, a continuous stream of ammonia may be synthesized to neutralize all or a portion of the formic acid then being simultaneously produced in the reaction and cooling zones.

In the carbon recovery unit of a preferred embodiment of our invention, the entrained particulate carbon in the effluent stream of gases from the synthesis gas generator is first contacted and collected in acidic rather than basic water in the quench zone of the generator and then in a scrubbing zone that may include a venturi or orifice scrubber and a wash tower through which the raw synthesis gas from the quench zone passes. In another embodiment of the invention, wherein a waste heat boiler is used to cool the effluent gaseous stream from the generator reaction zone, the gaseous stream is first contacted with acidic water in a scrubbing zone as described in said preferred embodiment. In either embodiment, the particulate carbon (soot) is recovered by mixing the soot-laden acidic water at a pH range between 5 to 7 inclusive with a light hydrocarbon liquid, such as straight-run naphtha. The oleophilic quality of the soot will then cause it to leave the water and disperse in the naphtha. There must be enough mixing to displace the water with which the soot is first wet and replace it by the naphtha. This may be accomplished with a mix valve or orifice.

In a decanter a clarified acidic water phase settles out and is recycled to the quench and scrubbing zone to cool the hot effluent gases from the reaction zone. The naphtha-carbon phase containing about 1 to 5 weight percent acidic water is removed from the top of the decanter, mixed with fuel oil, and introduced into a naphtha stripper. Naphtha is distilled off and the carbon stays with the fuel oil in the still bottoms. This fuel oil-carbon slurry is commonly admixed with fresh fuel oil feed and recycled as feed to the generator.

Light hydrocarbon liquids which may be used to extract the carbon from the carbon-acidic-water slurry forming a light hydrocarbon liquid-carbon-acidic water slurry and a clarified acidic water phase in the decanter include the range of hydrocarbon liquids from straight-run light naphtha to light kerosene, depending upon the operating conditions of temperature and pressure. Ordinarily, these light hydrocarbon liquids may contain as impurities about 0.1 to 1% of various compounds, e.g. naphthenic and cresylic acids, phenols (such as the cresols, xylenols and higher homologues), heterocyclic nitrogen compounds. In an alkaline system, we have found that these impurities form emulsifiers and soaps which contribute to the formation of light hydrocarbon liquid-carbon emulsions containing a high water content (10 to 20 weight percent). By maintaining the materials in the carbon-recovery system at a pH range between 5 to 7 inclusive by the process of our invention these system upsetting emulsions are avoided.

Light hydrocarbon liquids are generally more expensive than heavy fuel oils as feedstock for the synthesis gas generator. Therefore, a low cost heavy fuel oil is usually mixed with the light hydrocarbon liquid-carbon-acidic water slurry from the decanter and in a distillation column the light hydrocarbon is then recovered for reuse. Heavy fuel oils suitable for use in this process include heavy distillates, crude oil, residual crude oil, Bunker fuel and No. 6 fuel oils, reduced crude, vacuum residue, and hydrocracking bottoms. These fuel oils may contain as impurities about 0.1 to 1% naphthenic, cresylic, and other cyclic organic acids which form emulsifiers in an alkaline system. However, the acidic water carried into the distillation column by the light hydrocarbon liquid-acidic-water slurry will generally prevent these impurities from becoming effective emulsificants.

When reference is made to the term "emulsions" throughout the specification and claims, it is to be understood to include the thick semi-solids and gel-like slurries that may form in the decanter from carbon, light hydrocarbon liquid, water, cyclic organic acid or soap sludges.

Also included are the non-Newtonian gels comprising about 94 weight percent water, heavy fuel ends, light hydrocarbon liquid, cyclic organic acids or soap, and carbon that may be found in the light hydrocarbon liquid stripper.

It is important to eliminate oxygen from all parts of the system, especially the circulating water system. Oxygen not only causes increased corrosion but contributes to emulsion problems. Absorption of oxygen compounds or oxidation of surface compounds increases sharply the tendency of soot to stabilize emulsions in the decanter. By means of chemical agents such as hydrazine and sodium sulfide, traces of oxygen may be scavenged from all feedstreams except the raw synthesis gas which is already oxygen-free. The carbon-extraction unit should be maintained as a closed system with air excluded and blanketed with nitrogen. Furthermore, the input streams of water, the circulating water and the liquid extractants should be deaerated by conventional methods. For example, see "Water Treatment for Industrial and Other Uses," by Eskell Nordell, Chapter 9, Reinhold Publishing Co., 1951. Because of the high concentration of hydrogen and the absence of oxygen in the system, hydrogen sulfide and carbon dioxide in the product gas are not corrosive to carbon-steel. The following relationship was unexpectedly found in the operation of a partial oxidation synthesis gas generator in the pressure range of about 600 to 3000 p.s.i.g. with liquid hydrocarbon fuels. With unbuffered water recycled to the quench zone of the generator from the carbon recovery zone and having a relatively low ionic content (pH between 4 and 8.5), the pH of that quench water may be correlated with the partial pressure of saturated steam in the quench zone corresponding to the temperature of the water leaving the quench zone and the content of nitrogen in the liquid hydrocarbon feed to the generator and in the gaseous oxidant, if any.

Thus, what is really being said is that in this embodiment of our invention there is a fixed relation between the nitrogen content of the liquid hydrocarbon feed and oxidant, partial pressure of the steam in the quench zone of the generator, and the pH of the quench water. Furthermore, when a liquid hydrocarbon fuel (HC) is oxidized in a high pressure synthesis gas generator with 99.5 mole percent oxygen and steam is introduced into the reaction zone in an amount that provides a steam to liquid hydrocarbon weight ratio of less than about 0.7 and said quench zone is insulated to prevent heat loss and the temperatures of the water entering and leaving the quench zone and the temperature of the saturated steam in the quench zone are all substantially the same, the relationship between the aforesaid parameters may be expressed by Equation I:

$$\text{pH} = 2.8 \ln \frac{1950}{pp} + 2.4 \text{ (wt. percent nitrogen in HC feed)} \tag{I}$$

where: pH is used to designate the logarithm of the reciprocal of the hydrogen ion concentration in the quench water, $pp$ is the partial pressure in p.s.i.a. of saturated steam in the quench zone of the synthesis gas generator corresponding to the temperature of the water leaving the quench zone; and the wt. percent nitrogen in the HC feed refers to the total nitrogen in the hydrocarbon feed to the generator, that is the nitrogen in the primary hydrocarbon feed plus when present, the nitrogen in the supplemental feed of nitrogen containing organic materials as previously described.

Equation I may be used to determine the weight percent of nitrogen in the primary liquid hydrocarbon fuel by the steps of measuring the pH of the quench water before any supplemental nitrogen containing organic materials is added to the primary liquid hydrocarbon fuel, measuring the temperature of the quench water and finding ($pp$) the partial pressure of the saturated steam in the p.s.i.a. corresponding to said temperature from the standard tables for saturated steam, i.e. "Thermodynamic Properties of Steam" by J. H. Keenan and F. G. Keyes, and then solving Equation I. By substituting a desired pH to prevent corrosion i.e., 5 or more in Equation I at the same partial pressure ($pp$) of saturated steam in the quench tank as in the previous determination, the wt. percent of nitrogen in a blended fuel mixture comprising primary liquid hydrocarbon fuel plus supplemental nitrogen containing organic material may be determined.

By subtracting the wt. percent nitrogen in the primary hydrocarbon fuel as previously determined from the wt. percent nitrogen in the blended fuel mixture, the weight percent of nitrogen in the supplemental nitrogen containing organic material which was added to the primary hydrocarbon fuel to raise the quench water to a desired pH level may be determined. Finally, by a nitrogen balance, the actual amounts of primary hydrocarbon fuel and supplemental nitrogen containing organic material may be calculated.

The pH of the quench water and the water in the carbon recovery zone is substantially the same, since as previously discussed, the quench zone and carbon recovery zone are part of the same circulating water system.

Equation II is similar to Equation I but in addition provides for an oxygen containing gas (oxidant) that contains some elemental nitrogen i.e., oxygen-enriched air. Elemental nitrogen supplied in gases such as the oxygen-enriched air is only half as effective as organic nitrogen. Otherwise, the terms and system operating conditions in Equation II are the same as those defined previously in connection with Equation I.

$$\text{pH} = 2.8 \ln \frac{1950}{pp} + 240 \times \left( \frac{\text{lbs. nitrogen in HC feed} + \frac{1}{2} \text{ (lbs. nitrogen in oxidant)}}{\text{lbs. HC feed}} \right) \tag{II}$$

The following examples are offered as a better understanding of the present invention, but the invention is not to be construed as unnecessarily limited thereto.

EXAMPLE I 628 pounds per hour of Arabian crude oil having a gravity of 34° API, a gross heating value of 19,308/B.t.u. lb., and 0.04 weight percent of nitrogen is heated to a temperature of 666° F. and charged into the 1.85 cubic foot reaction zone of a non-catalytic flow-type unpacked synthesis gas generator. Substantially pure oxygen (99.5 mole percent of $O_2$ or higher containing 0 mole percent of $N_2$) is preheated to 300° F. and supplied to said reaction zone at a rate of 5486 standard cubic feet per hour in admixture with 235 pounds per hour of 666° F. process steam. The resulting mixture of oil, steam and oxygen is reacted in the generator at an autogeneous temperature of 2293° F. and a pressure of 1015 p.s.i.a.

26,876 standard cubic feet per hour of effluent gas is discharged from the reaction zone comprising in volume or mole percent (dry basis) about 43.8 carbon monoxide, 57.9 hydrogen, 5.8 carbon dioxide, 2.3 methane, and .08 hydrogen sulfide. In addition, present in the effluent gas from the reaction zone are about 1.5 weight percent of particulate carbon (basis carbon in the fuel), and small amounts of $H_2O$, $NH_3$, and $HCOOH$.

The effluent gas from the reaction zone is quickly cooled below the reaction temperature by being discharged into 5600 pounds per hour of water contained in a quench tank located immediately below the reaction zone. The quench tank is insluated so that the temperature of the water entering the quench tank and the water leaving the quench tank is about the same, i.e., 423° F. The partial pressure of saturated steam corresponding to this temperature as found in a standard table showing the properties of saturated steam i.e., Keenan and Keyes is 405 p.s.i.a. Large quantities of steam are generated in the quench tank having a partial pressure corresponding to the temperature of the water leaving the quench tank.

Additional formic acid is produced in the quench tank by the reaction of carbon monoxide and water. Also, additional ammonia is synthesized in the quench tank by the reaction of nitrogen radicals from the feed and hydrogen in the effluent gas. Further, the uncoverted particulate carbon is srtipped from the effluent gas stream by the vigorous scrubbing that the gaseous effluent gets as it passes through the water, and a slurry of particulate carbon and water is formed in the quench tank.

About 5600 pounds per hour of particulate carbon-water slurry is withdrawn from the quench tank and passed into a standard separation zone where clear water is separated from the particulate carbon and is recycled to the quench tank to recover particulate carbon from the effluent synthesis gas as previously described. Examples of standard separation zones include vacuum filters and gravity sedimentation vessels. After several hours of operation in the aforesaid manner, the system becomes stabilized and the pH of the water in the quench tank drops to about 4.5.

Continued operation of the system with the quench waters at this pH level will result in corrosion of the piping, valves and other equipment in the line made from caron-steel.

By increasing the pH of the quench water to a level above 5, for example 5.4, the aforesaid corrosion may be substantially stopped. This may be accomplished by blending a portion of the Arabian crude oil (referred to as the primary fuel) containing 0.04 weight percent nitrogen with a smaller amount of a comparatively high nitrogen containing liquid hydrocarbon fuel (referred to as the supplemental fuel), and feeding the mixture to the generator. For example, the supplemental fuel may be Wafra crude oil having an 23.6° API, a gross heating value of 18,495 and a nitrogen content of 1.5 weight percent.

The amount of Wafra crude oil necessary for blending with the Arabian crude oil to raise the pH of the quench water to 5.4 may be determined experimentally by use of Equation I.

The use of Equation I will be illustrated to determine the amount of Wafra crude oil required to be blended with Arabian crude oil to form a mixture, which when fed to the reaction zone will provide the quench water with the desired pH of 5.4. By substituting in Equation I, 5.4 for pH, 405 for $pp$ and solving, the wt. percent nitrogen in HC feed to the reaction zone (which represents in this case the weight percent of nitrogen in the mixture comprising Arabian crude oil plus the Wafra crude oil) is determined to be 0.40 weight percent.

The amounts of primary and supplemental fuel in the mixture may be then determined by a nitrogen balance as follows, where X represents the lbs. per hr. of Wafra crude oil: 628 lbs. per hr. of mixed hydrocarbon feed (HC) times .004 lb. of nitrogen per lb. of mixed hydrocarbon feed is equal to (628−X) lbs. per hr. of Arabian crude oil times .0004 lb. of nitrogen per lb. of Arabian crude oil plus X lbs. per hr. of Wafra crude oil times .015 lb. of nitrogen per lb. of Wafra crude oil.

By either of the aforesaid procedures, it may be shown that 157 pounds per hour of Wafra crude oil blended with 471 pounds per hour of Arabian crude oil and introduced into the reaction zone as feed will raise the pH of the quench water to a level of 5.4. All of the other quantities and conditions are given in the previous run without the supplemental fuel remaining substantially the same, including the product gas.

In the previous example, the weight percent of nitrogen in the primary and supplemental liquid hydrocarbon fuels may be first determined by standard methods of chemical analysis or by means of Equation I, as previously described. The pH and temperature of the quench water may be determined by standard testing procedures.

EXAMPLE II

The use of elemental nitrogen as supplied in gases such as the gaseous oxidant (oxygen enriched air) for supplementing the nitrogen in the primary fuel is illustrated by Example II.

Example II shows that the pH level of 5.4 as determined in Example I may be attained with a reduced amount of supplemental high nitrogen Wafra crude oil.

By replacing the substantially pure oxygen (99.5 mole percent) in Example I with oxygen-enriched air (97 mole percent $O_2$+0.5 mole percent $N_2$) in an amount sufficient to provide the same amount of $O_2$, while keeping all other conditions substantially the same, it may be shown that by substituting in Equation II, 5.4 for pH, 405 for $pp$, 2.08 for lbs. nitrogen in oxygen-enriched air, and 628 for lbs. of mixed hydrocarbon (HC) feed and solving, the lbs. of nitrogen in the mixed hydrocarbon feed (HC) is determined to be 1.57. By a simple nitrogen balance it may be shown that the feed to the reaction zone will now comprise 538 lbs. per hr. of Arabian crude oil and 90 lbs. per hr. of Wafra crude oil.

The process of the invention has been described generally and by examples with reference to liquid hydrocarbon feedstocks, effluent synthesis gas streams, liquid extractants, and various other materials of particular compositions for purposes of clarity and illustration only. From the foregoing it will be apparent to those skilled in the art that the various modifications of the process and the materials disclosed herein can be made without departure from the spirit of the invention.

We claim:

1. In a process for producing snythesis gas in the reaction zone of an unpacked noncatalytic synthesis gas generator at an autogenous temperature in the range of about 1800 to 3000° F. by the partial oxidation of a hydrocarbon fuel feed with an oxygen containing gas selected from the group consisting of substantially pure oxygen and oxygen enriched air and optionally with $H_2O$ and quenching in a quench zone the hot effluent gases from said reaction zone comprising hydrogen, carbon monoxide and a small amount of particulate carbon, said hydrocarbon fuel feed being one which when subjected to partial oxidation at the elevated temperature and pressure of said process and quenched would in the absence of added nitrogen containing organic compounds produce a pH of less than 5 in the quench water, the improvement for preventing the corrosion of carbon-steel piping, valves, and equipment due to the formation of corrosive amounts of by-product formic acid in said process at an elevated pressure in the range of about 600 to 3000 p.s.i.g., which comprises introducing into said reaction zone along with said hydrocarbon fuel feed a supplemental amount of nitrogen containing organic compounds selected from the group consisting of hydrocarbyl amines containing 1 to 50 carbon atoms, organic nitrogen compounds as naturally present in liquid hydrocarbon fuels, petroleum distillation bottoms and coal tar, and mixtures thereof, continuously synthesizing ammonia in said reaction and quench zones, and neutralizing said formic acid with said synthesized ammonia to a level noncorrosive to carbon-steel.

2. The process of claim 1 wherein the pH of the quench water is raised to at least 5.

3. The process as claimed in claim 1 wherein said supplemental nitrogen containing organic compounds are selected from the group of compounds naturally occurring in liquid hydrocarbon fuels and consisting of pyridines, carbazoles, indoles, pyrroles, quinolines, porphyrins, and mixtures thereof.

4. The process as claimed in claim 1 wherein said hydrocarbyl amines are selected from the group consisting of hexylamine, aniline, and sec-alkyl primary amine in the range of $C_{10}$ to $C_{14}$.

5. The process as claimed in claim 1 wherein said hydrocarbon fuel feed is a liquid hydrocarbon fuel, and the hot effluent gases from the reaction zone are cooled and separated of particulate carbon by direct quenching in a quench zone with water at a temperature in the range of about 300 to 650° F. forming a water-carbon dispersion, said quench water being at a pH of 5 or higher.

6. The process of claim 5 wherein said quench water is acidified by the absorption of formic acid produced within the process and is at a pH in the range from 5 to 7 inclusive, and said particulate carbon is removed from said effluent gases, forming an acidic water-carbon dispersion.

7. The process of claim 6 with the added steps of mixing said acidic water-carbon dispersion with a light hydrocarbon liquid in a mixing zone so as to form a light hydrocarbon liquid-carbon-acidic water slurry and a clarified acidic water phase, separating the clarified acidic water phase from the light hydrocarbon liquid-carbon-acidic water slurry in a decanting zone, recycling said clarified acidic water phase to said quench zone, and separating particulate carbon from said light hydrocarbon liquid-carbon-acidic water slurry in a distillation zone.

8. The process as claimed in claim 5 with the added step of deaerating said quench water to reduce the concentration of dissolved oxygen to below 0.005 part per million.

9. The process of claim 1 further provided with the step of introducing supplemental elemental nitrogen into said reaction zone in place of a portion of the nitrogen supplied by said supplemental nitrogen containing organic compounds.

10. In a process for producing gaseous mixtures principally comprising hydrogen and carbon oxides in the reaction zone of an unpacked noncatalytic gas generator at an autogenous temperature in the range of about 1800 to 3000° F. by the partial oxidation of a hydrocarbon fuel feed with an oxygen containing gas selected from the group consisting of substantially pure oxygen and oxygen enriched air, and optionally with $H_2O$, and cooling the hot effluent gases from said reaction zone in a quench zone by quenching at a temperature in the range of about 300 to 650° F., said hydrocarbon fuel feed being one which when subjected to partial oxidation at the elevated temperature and pressure of said process and quenched would in the absence of added nitrogen containing organic compounds produce a pH of less than 5 in the quench water, the improvement for raising the pH of the system and preventing the corrosion of the carbon steel piping, valves, and equipment due to the formation of corrosive amounts of by-product formic acid in said process at an elevated pressure in the range of about 600 to 3000 p.s.i.g., which comprises introducing into said reaction zone supplemental liquid hydrocarbon fuel containing about 0.30 to 3.0 weight percent or more of nitrogen in the form of naturally occurring nitrogen containing organic compounds selected from the group consisting of hydrocarbyl amines containing 1 to 50 carbon atoms, organic nitrogen compounds as naturally present in liquid hydrocarbon fuels, petroleum distillation bottoms and coal tars, and mixtures thereof in admixture with said hydrocarbon fuel so as to produce a fuel mixture comprising 50 to 95 weight percent of said hydrocarbon fuel and 5 to 50 weight percent of said supplemental liquid hydrocarbon fuel, continuously synthesizing ammonia in said reaction and quench zones, and neutralizing a sufficient amount of said formic acid with said synthesized ammonia so as to maintain the pH of said quench water at a level of at least 5.

11. In a process for producing synthesis gas in the reaction zone of an unpacked noncatalytic synthesis gas generator at an autogenous temperature in the range of about 1800 to 3000° F. by the partial oxidation of a hydrocarbon fuel feed with an oxygen containing gas selected from the group consisting of substantially pure oxygen and oxygen enriched air and optionally with $H_2O$, and cooling by indirect cooling in a cooling zone and scrubbing in a scrubbing zone the hot effluent gases from said reaction zone principally comprising hydrogen, carbon monoxide and a small amount of particulate carbon, said hydrocarbon fuel feed being one which when subjected to partial oxidation at the elevated temperature and pressure of said process and cooled by indirect heat exchange in a cooling zone and scrubbed in a scrubbing zone would in the absence of added nitrogen containing organic compounds produce a pH of less than 5 in the scrubbing water, the improvement for preventing the corrosion of carbon-steel piping, valves, and equipment due to the formation of corrosive amounts of by-product formic acid in said process at an elevated pressure in the range of about 600 to 3000 p.s.i.g., which comprises introducing into said reaction zone along with said hydrocarbon fuel feed a supplemental amount of nitrogen containing organic compounds selected from the group consisting of hydrocarbyl amines containing 1 to 50 carbon atoms, organic nitrogen compounds as naturally present in liquid hydrocarbon fuels, petroleum distillation bottoms and coal tar, and mixtures thereof, continuously synthesizing ammonia in said reaction, cooling, and scrubbing zones, and neutralizing said formic acid with said synthesized ammonia to a level noncorrosive to carbon-steel.

12. The process of claim 11 wherein the hot effluent gases from the reaction zone are cooled to a temperature in the range of about 300 to 650° F. by indirect heat exchange in a waste heat boiler and by direct contact with water in a scrubbing zone in which said particular carbon is removed from said effluent gases by forming a dispersion of carbon in scrubbing water at a pH of 5 or higher.

13. The process of claim 11 wherein said scrubbing water is acidified by the absorption of formic acid produced within the process and is at a pH in the range from 5 to 7 inclusive, and said particulate carbon is removed from said effluent gases, forming an acidic water-carbon dispersion.

14. The process claimed in claim 13 with the added steps of mixing said acidic water-carbon dispersion with a light hydrocarbon liquid in a mixing zone so as to form a light hydrocarbon liquid-carbon-acidic water slurry and a clarified acidic water phase, separating the clarified acidic water phase from the light hydrocarbon liquid-carbon-acidic water slurry in a decanting zone, recycling said clarified acidic water phase to said scrubbing zone, and separating particulate carbon from said light hydrocarbon liquid-carbon-acidic water slurry in a distillation zone.

15. The process as claimed in claim 12 with the added step of deaerating said scrubbing water to reduce the concentration of dissolved oxygen to below 0.005 part per million.

References Cited
UNITED STATES PATENTS

| | | | |
|---|---|---|---|
| 2,700,677 | 1/1955 | Bowen et al. | 260—452 |
| 3,097,081 | 7/1963 | Eastman et al. | 48—215 |
| 3,150,931 | 5/1964 | Frank | 23—213 |
| 3,473,903 | 10/1969 | Paull et al. | 48—212 |

FOREIGN PATENTS

| | | | |
|---|---|---|---|
| 3,923 | 8/1883 | Great Britain | 23—197 |

LEON ZITVER, Primary Examiner

A. SIEGEL, Assistant Examiner

UNITED STATES PATENT OFFICE
CERTIFICATE OF CORRECTION

Patent No. 3,752,771  Dated August 14, 1973

Inventor(s) R. Dille - W. Schlinger

It is certified that error appears in the above-identified patent and that said Letters Patent are hereby corrected as shown below:

| | |
|---|---|
| Col. 3 line 46 | Change "distilaltes" to --distillates-- |
| col. 7 line 75 | Before "p.s.i.a." delete "the" |
| col. 8 line 47 | rearrange "/" (slash) to after "B.t.u." |
| col. 8 line 71 | change "insluated" to --insulated-- |
| col. 9 line 10 | change "srtipped" to --stripped-- |
| col. 9 line 69 | change "are" to --as-- |
| col. 10 line 34 | change "snythesis" to --synthesis-- |

Signed and Sealed this third Day of February 1976

[SEAL]

Attest:

RUTH C. MASON
Attesting Officer

C. MARSHALL DANN
Commissioner of Patents and Trademarks